J. E. HARPER & M. S. BARNES.
EXPANSIBLE TIRE RACK FOR AUTOMOBILES.
APPLICATION FILED JULY 15, 1915.

1,187,831.

Patented June 20, 1916.
2 SHEETS—SHEET 1.

Witnesses:
C. J. Belh
R. F. Lansdale

Inventors
James E. Harper and
Marion S. Barnes

By Tabert Whitman
Attorneys

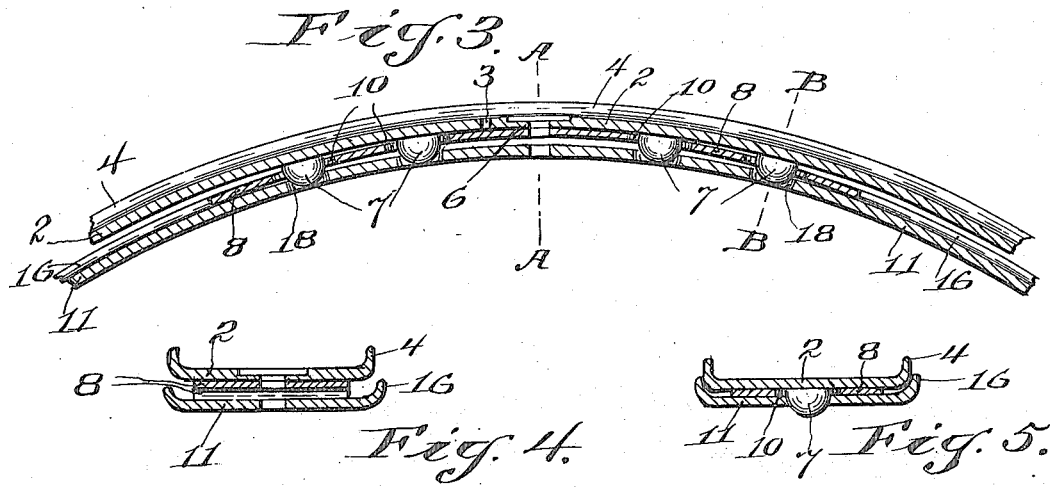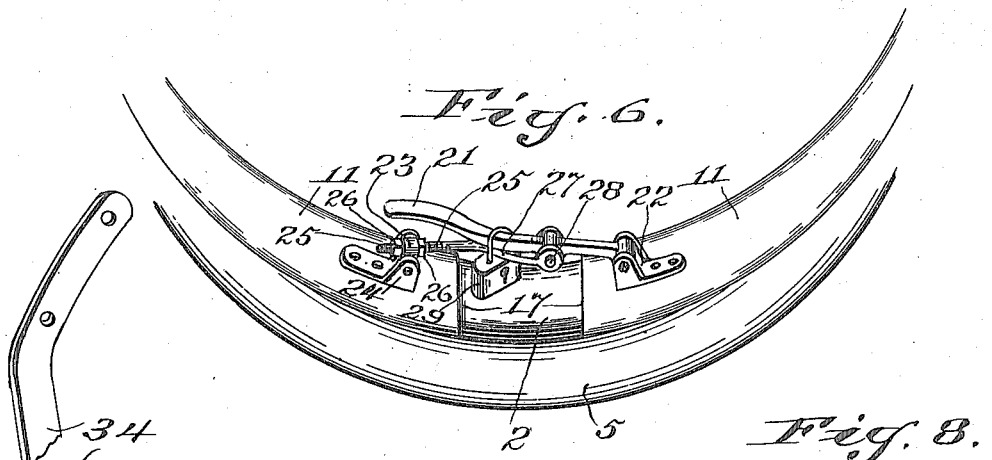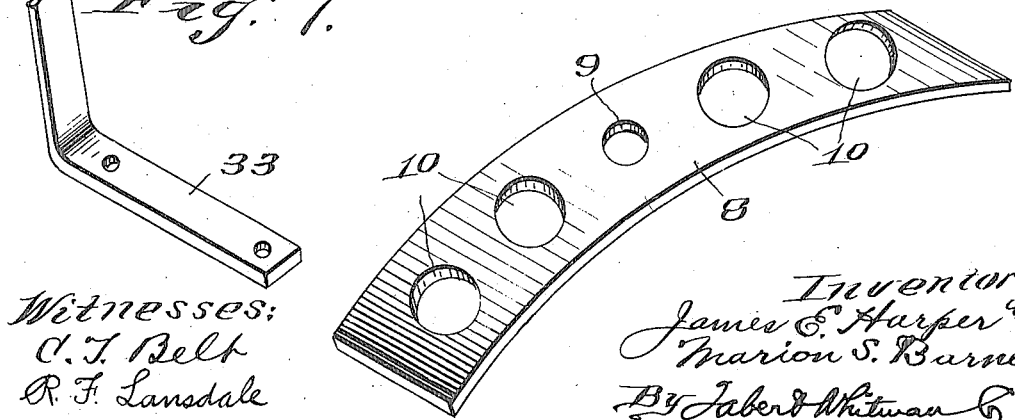

UNITED STATES PATENT OFFICE.

JAMES E. HARPER AND MARION S. BARNES, OF PAISLEY, OREGON.

EXPANSIBLE TIRE-RACK FOR AUTOMOBILES.

1,187,831.

Specification of Letters Patent.   Patented June 20, 1916.

Application filed July 15, 1915.   Serial No. 39,983.

*To all whom it may concern:*

Be it known that we, JAMES E. HARPER and MARION S. BARNES, citizens of the United States, residing at Paisley, in the county of Lake and State of Oregon, have invented certain new and useful Improvements in Expansible Tire-Racks for Automobiles, of which the following is a specification.

This invention relates to spare tire carriers for automobiles, and pertains especially to an expansible and contractible rack or holder applicable to motor vehicles of various character for carrying tires, tire rims and tire casings.

The object of the invention is to provide an expansible, contractible, and adjustable rack or holder adapted to be attached to motor vehicles for carrying inflated demountable tires, rims and casings of various size.

A further object of the invention is to provide novel and peculiar locking means for expanding and contracting the holder and for adjusting or limiting the expansion and contraction.

A still further object of the invention is to provide novel and peculiar devices, in a demountable tire holder, for adjustably connecting the split portion of each ring of a pair of open rings, and for adjustably connecting said rings.

A still further object of the invention is to provide resilient brackets for attaching the holder to an automobile so as to permit expansion and contraction of the holder in mounting and demounting spare rims, inflated tires, and casings.

Various other objects, advantages and improved results are attainable in the practical application of the invention hereinafter fully described.

Figure 1:
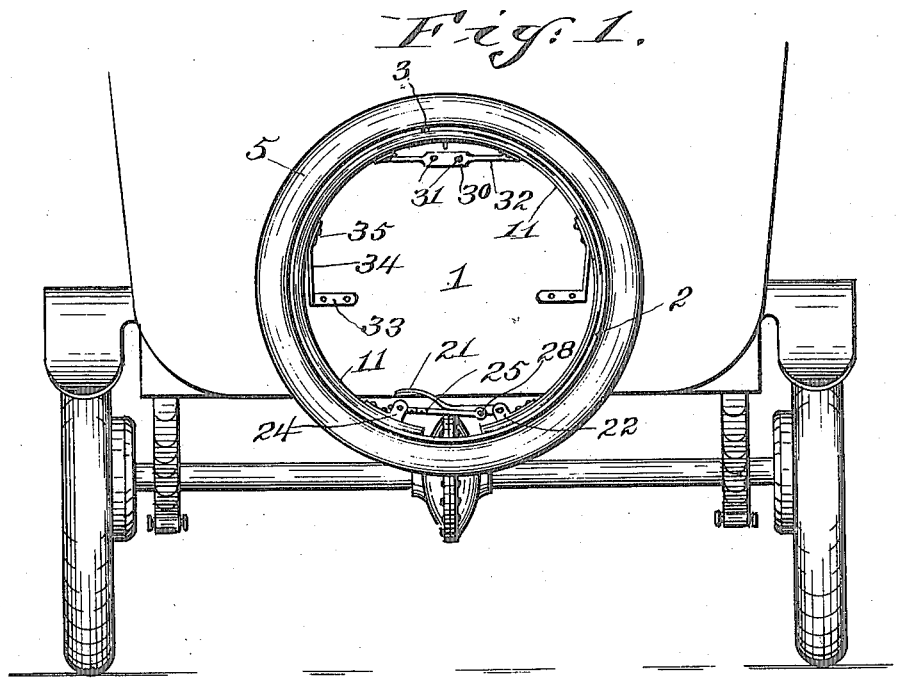
Figure 2:
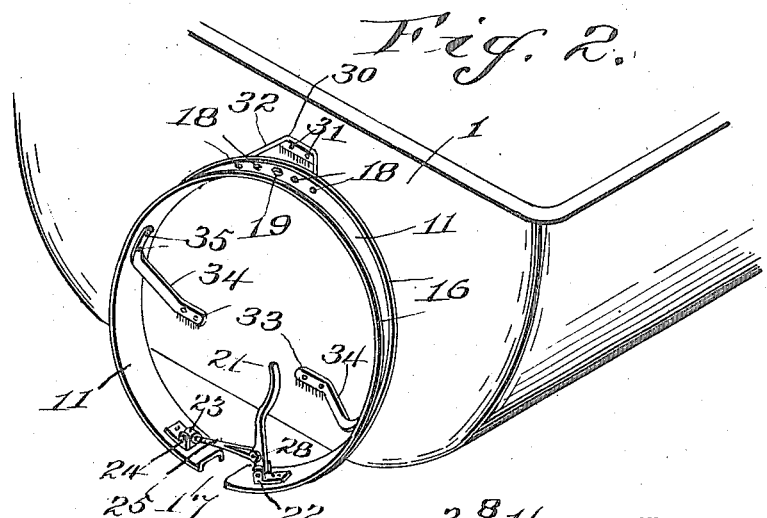
Figure 9:
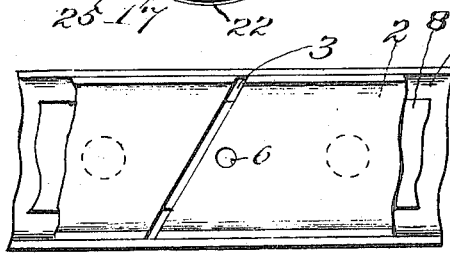

In the accompanying drawings forming part of this application:—Figure 1 is a rear view of part of an automobile showing the application of the invention thereto and holding an inflated spare tire. Fig. 2 is a perspective view of part of the rear end of an automobile showing one ring in position to have the other ring applied thereto. Fig. 3 is a transverse sectional view taken through the rings and the spring plate in unclamped position. Fig. 4 is an enlarged detail cross section taken on the dotted line A—A Fig. 3. Fig. 5 is a similar view taken on the dotted line B—B Fig. 3, showing the parts clamped. Fig. 6 is a detail perspective view. Fig. 7 is a detail perspective view of one of the resilient brackets, partly broken away. Fig. 8 is a detail perspective view of the spring clamping plate. Fig. 9 is a detail top view partly broken away.

The same reference characters denote the same parts throughout the several views of the drawings.

The carrier being especially applicable to the rear of motor vehicles, it is shown and described as secured to the back 1 of an automobile, although it may be attached to other parts of such vehicles by slight mechanical variations in the means of attachment.

In carrying out our invention we employ a pair of concentric open rings preferably composed of sheet steel or other material capable of affording resiliency sufficient to permit one ring to be expanded within the other ring, the outer ring 2 of said pair constituting a demountable rim.

The demountable rim 2 is open or split at 3, and has annular flanges 4 between which an inflated tire 5, is held. One end of the rim 2 is provided with a valve stem hole 6, and said rim has a plurality of lugs 7, preferably a pair of such lugs on the inner face of the rim adjacent to each side of said split portion. A spring clamping plate 8, having a valve stem hole 9 similar to and registering with the hole 6, and apertures 10 for the lugs 7, is located between the rim 2 and the ring 11. The inner ring 11, has annular flanges 16, between which the rim 2 is seated on the plate 8, and the ring 11 has an opening 17 sufficient to permit the ring to be contracted and expanded to various sizes, or according to the size of a demountable rim. The ring 11, is provided with a plurality of apertures 18, preferably a pair of such apertures on each side of a valve stem hole 19, for the lugs 7, which extend through the spring plate apertures 10, and through the apertures 18. The lugs 7 and the plate 8 afford means for connecting the split portion of the rim 2, opposite the openings 17 of the ring 11, with the plate 8 forming a cushion or resilient element between the rim and the ring opposite the ring opening 17. It will be seen that the plate 8 performs two functions, in that it spans the split of the rim 2 and it forms a spring between the rim and the ring 11.

The device for expanding, contracting and locking the ring in various positions, comprises a hand lever 21, pivoted in a bracket 22 secured upon the inner face of the ring 11, adjacent to one side of the opening 17, a trunnion 23 pivoted in a bracket 24 secured upon the inner face of the ring adjacent to the other side of each side of said opening and having the screw end of a connecting lever 25 adjustable in said trunnion by means of suitable lock nuts 26, the other end of the lever 25 having a slot or forks 27 fulcrumed to the hand lever at 28. Obviously by operating the hand lever the ring 11, may be expanded and contracted as desired and such expansion and contraction may be varied by adjusting the connecting lever. The levers may be fastened by a suitable pad lock 29.

The means for attaching the ring 11, and thereby suspending the carrier or rack in proper position, comprises a top bracket 30, secured at 31 to the automobile body and having arms 32 secured to the inner face of the ring 11 adjacent to the apertures 18, so that the portions of the ring extending from the arms 32 are expansible and contractible together, and said means further comprises a pair of brackets 33 secured to the body of the vehicle, and each bracket has a spring arm 34 secured to the inner face of the ring 11 at 35. Obviously the spring arms permit the ring to be expanded and contracted as desired, and said arms assist in holding the ring in adjusted positions, in addition to forming means for connecting the resilient portions of the ring with the vehicle body, so that, by means of the bracket 30 and the brackets 33, the carrier, rack or holder is given fixed attachment to the vehicle body when carrying a spare tire 5, rim or casing.

Obviously our rack holder may be employed to carry inflated tires independent of the rims, or to carry demountable rims having the tire thereon.

We do not wish to limit or confine ourselves to any particular size, material or number of parts in the manufacture of our invention, nor to the application thereof, but reserve to ourselves the right to make such changes and variations in the practical application of our invention as may come within the scope of the appended claims.

Having thus described our invention what we claim as new and desire to secure by Letters Patent is:—

1. A carrier for demountable tires comprising a demountable split rim for holding the tire, a ring expansible and contractible within the rim, means for resiliently supporting the ring, a resilient connection between the ring and the rim and connecting the split portion of the rim, and means attached to the ring for expansion and contraction.

2. A carrier for demountable tires comprising a demountable split rim for holding the tire, an expansible ring within the demountable rim and having an opening, a spring plate interposed between the ring and the rim and spanning said split, means attached to the ring for expansion and contraction, and means for resiliently suspending the ring.

3. A carrier for demountable tires comprising a demountable rim for holding the tire, an expansible ring within the rim, a spring plate interposing the ring and the rim, a pair of spring arms secured to the ring for resiliently suspending the ring, and means attached to the ring for expanding and contracting the ring.

4. In a device of the character described, a pair of rings fitting one within the other, a spring plate between the rings and having a plurality of apertures, a plurality of like apertures in the inner ring, and a plurality of lugs on the outer ring for engaging the apertures of the plate and of the inner ring, and means attached to the inner ring for expanding and contracting this ring.

5. A rim and tire carrier for automobiles, comprising a resilient ring having an opening, a demountable rim, a resilient device between the ring and the rim opposite said opening and adapted to be expanded by the said ring, and a pair of levers fulcrumed together and pivotally attached to the ring and extending across the opening of the ring for expanding and contracting the ring.

In testimony whereof we affix our signatures in presence of two witnesses.

JAMES E. HARPER.
MARION S. BARNES.

Witnesses:
A. DEVAUL,
E. H. CONSER.